(12) United States Patent
Kelly

(10) Patent No.: US 8,960,730 B2
(45) Date of Patent: Feb. 24, 2015

(54) PET CAGE REMOTE DOOR OPENER

(76) Inventor: Howard L. Kelly, Centreville, VA (US)

( * ) Notice: Subject to any disclaimer, the term of this patent is extended or adjusted under 35 U.S.C. 154(b) by 869 days.

(21) Appl. No.: 12/929,720

(22) Filed: Feb. 11, 2011

(65) Prior Publication Data

US 2012/0205919 A1    Aug. 16, 2012

(51) Int. Cl.
E05C 19/00 (2006.01)
E05B 47/00 (2006.01)
A01K 1/00 (2006.01)
A01K 1/03 (2006.01)
A01K 1/035 (2006.01)
E05C 21/00 (2006.01)
E05B 47/02 (2006.01)
E05C 1/04 (2006.01)

(52) U.S. Cl.
CPC .......... *E05B 47/0004* (2013.01); *A01K 1/0017* (2013.01); *A01K 1/033* (2013.01); *A01K 1/035* (2013.01); *E05B 47/026* (2013.01); *E05B 2047/0091* (2013.01); *E05B 2047/0094* (2013.01); *E05C 1/04* (2013.01); *Y10S 292/35* (2013.01)
USPC ............................. 292/2; 292/1; 292/DIG. 35

(58) Field of Classification Search
USPC .......................................... 292/2, 1, DIG. 35
See application file for complete search history.

(56) References Cited

U.S. PATENT DOCUMENTS

| 3,760,768 | A | | 9/1973 | Patterson | |
|---|---|---|---|---|---|
| 5,261,260 | A | * | 11/1993 | Lin | 70/280 |
| 5,615,514 | A | | 4/1997 | Meade, Jr. | |
| 5,815,895 | A | * | 10/1998 | Carlson et al. | 24/603 |
| 5,852,944 | A | * | 12/1998 | Collard et al. | 70/278.7 |
| 5,855,184 | A | | 1/1999 | Eichler et al. | |
| 6,462,431 | B1 | * | 10/2002 | Woo | 307/9.1 |
| 6,698,263 | B2 | * | 3/2004 | Hsieh | 70/257 |
| 6,710,714 | B2 | | 3/2004 | Conway | |
| 7,191,733 | B2 | | 3/2007 | Tsai | |
| 7,393,023 | B1 | * | 7/2008 | Kelly | 292/144 |
| 8,359,783 | B1 | * | 1/2013 | Kamery et al. | 43/61 |

* cited by examiner

*Primary Examiner* — Mark Williams

(57) ABSTRACT

An apparatus for remotely opening the door of a pet cage. The apparatus has a linear solenoid connected to a latch on the enclosure. The solenoid is connected to control circuitry operated by a remote control unit. The apparatus is mounted on the cage with a spacer plate and a mounting plate. The spacer plate has a recess to receive the free end of the bolt portion of the latch and guide its travel away from interference with parts of the cage when the solenoid is operated. The mounting plate extends behind the latch portion on the door to prevent the caged pet from pawing at the latch and possibly opening it. A second mounting plate may be mounted behind the latch portion on the cage to protect that part of the latch. The spacer plate is uniquely designed to allow application of the apparatus to any size and/or configuration of cage without the need of any separate or additional pieces of adaptor hardware.

18 Claims, 1 Drawing Sheet

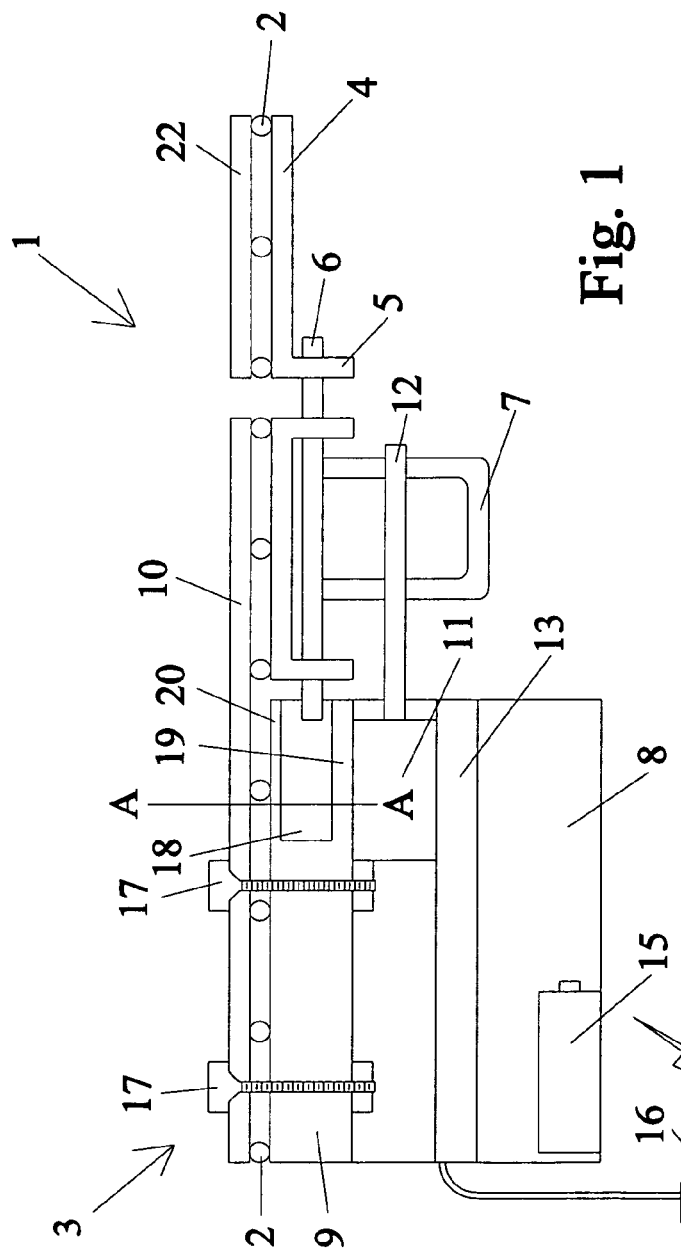
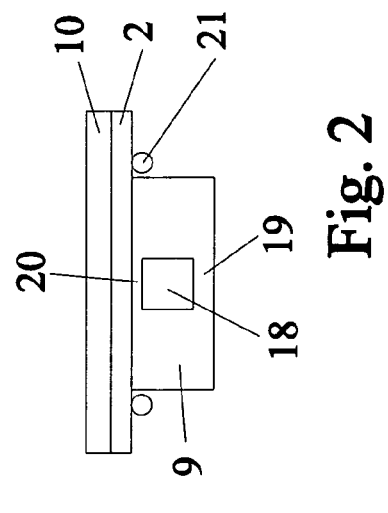

US 8,960,730 B2

PET CAGE REMOTE DOOR OPENER

BACKGROUND OF THE INVENTION

This invention relates, in general, to cages of the type typically used to transport and house pets such as dogs and cats, and, in particular, to an apparatus to allow the pet to exit the cage from a remote location. The invention involves several improvements to the invention described in U.S. Pat. No. 7,793,023 titled Remote Door Opener which issued Jul. 1, 2008, and which is incorporated herein by reference.

Previous models of pet cage door latches are known to be susceptible to manipulation by the pets confined within the cage. Having seen their keepers manipulate the door latch to open and shut the cage door, some pets will paw at the latch mechanisms in an effort to open the latch. The instant invention prevents such actions by the encaged pets. It also provides for wider adaptability to more enclosure designs and types, and offers a compact and efficient design that allows the use of batteries instead of AC power.

DESCRIPTION OF THE PRIOR ART

In the prior art various types of devices have been proposed. For example, U.S. Pat. No. 7,393,023 issued Jul. 6, 2010, to Rouns for a Bear-Proof Latch For A Refuse Container. This reference shows a latch mechanism for a trash bin which is located in an area frequented by bears. To prevent the latch mechanism from being opened by bears, a shield (78) is placed over a vulnerable part of the mechanism (see FIG. 12).

U.S. Pat. No. 7,191,733 issued Mar. 20, 2007, to Tsai for a Door Latch Device For Pet Cages. This reference shows a mounting plate used to mount a latch to a wire cage.

U.S. Pat. No. 6,710,714 issued Mar. 23, 2004, to Conway for a Pet Cage Assembly Having Smoke Activated Escape Feature. This reference shows a remotely operated pet cage door release which can be powered by either batteries (31) or a wall outlet (32).

U.S. Pat. No. 5,855,184 issued Jan. 5, 1999, to Eichler et al for a Animal Feeding Device And Support. This reference shows a feeding cup which is mounted on a wire cage (37) using two mounting brackets (33, FIG. 5). The brackets have indentations (34) which allow them to be used on many wire cage designs.

U.S. Pat. No. 5,615,514 issued Apr. 1, 1997, to Meade, Jr. for an Animal Trap. This reference shows a guard plate (95) which prevent the animal from operating the trip wire which releases the door.

U.S. Pat. No. 3,760,768 issued Sep. 25, 1973, to Patterson for a Cage Apparatus. This reference shows a protective guard shield (67) mounted over the cage mechanism to prevent the caged animal from contacting the mechanism.

Medium Dome Top Parrot Cage, a product offered by America's Pet Store web site on Nov. 28, 2010. The URL is: http://www.americas-pet-store.com/prevue-hendryx-3162-medium-dome-top-parrot-cage.html. The parrot cage is provided with a cup door lock that features a metal strip lock that is placed in such a way to prevent the bird from opening the cup door.

SUMMARY OF THE INVENTION

The present invention is directed to an apparatus for remotely opening a door of an enclosure. The apparatus has a linear solenoid connected to a latch on the enclosure. The solenoid is powered by batteries, or connected to an electrical outlet, and the outlet is operated by a remote control. The apparatus is mounted on the cage with a mounting plate which prevents the caged pet from accessing the apparatus and latch mechanisms.

It is an object of the present invention to provide a new and improved device for remotely opening a door of an cage which is protected from manipulation by a caged pet.

It is an object of the present invention to provide a new and improved device for remotely opening a door of an enclosure which can be easily and quickly retrofitted to an existing enclosure or incorporated into an enclosure being built.

These and other objects and advantages of the present invention will be fully apparent from the following description, when taken in connection with the annexed drawings.

BRIEF DESCRIPTION OF THE DRAWINGS

FIG. 1 is top view of the present invention attached to a pet cage.

FIG. 2 is a sectional view along the line A-A of FIG. 1.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Referring now to the drawings in greater detail, FIG. 1 shows a partial view of a pet cage 1 made up of a plurality of vertical bars 2 and horizontal bars 21, some of which form a door 3 to allow the pet to enter and exit the cage. It should be noted that while an enclosure made from bars is illustrated in the drawings, the invention could be used with enclosures of any shape or material. The frame portion of the cage 1 has a double horizontal bar 4 with a bent end to form a keeper 5. The keeper has an aperture to receive a bolt 6 which is mounted on the door 3. The bolt 6 has a U-shaped handle 7 attached thereto by any conventional method. The U-shaped handle 7 is used to slide the bolt 6 in and out of engagement with the keeper 5. When the bolt 6 is engaged with the keeper 5 the door 3 cannot be opened. When the bolt 6 is disengaged from the keeper 5 the door 3 can be opened. In addition to sliding the bolt 6, the U-shaped handle 7 also rotates the bolt. When sliding the bolt 6 the U-shaped handle 7 is perpendicular to the door 3. When the bolt is in either the engaged or unengaged position, the U-shaped handle 7 may be rotated downward to a position parallel to the door, which if positioned correctly and not disturbed, locks the bolt 6 in position and prevents the bolt 6 from sliding. Up to this point the cage, keeper and bolt are conventional pet cage items and, therefore, no further explanation is needed or will be given.

The conventional cage must be opened manually, however, at certain times it is inconvenient to open the cage door manually. At such times it would be convenient to be able to unlatch the door of the cage from a remote location. The present invention is designed for such occasions.

A control box 8 is mounted on the door 3 by a spacer 9 and a mounting plate 10. A solenoid 11 is mounted inside the control box 8. A solenoid rod 12 extends from the solenoid 11. The solenoid rod 12 is connected to the U-shaped handle 7 by any conventional means (not shown) such as a clamp with nuts and bolts or a plastic tie wrap. The solenoid 11 is connected to control circuitry 13 which includes a received for receiving signals from a remote control unit 14. The control circuitry is powered by batteries 15, or an external power source 16. The external power source 16 may be any conventional power source such as a wall outlet.

A control box 8 is mounted on the door 3 by a spacer 9 and a mounting plate 10. Widely varying thicknesses and spacings of vertical bars 2 and horizontal bars 21 amongst different models and sizes of enclosures present a difficult challenge in providing a way to attach control box 8 to the door 3. Control box 8 must be mounted parallel to the plane of the door 3 and there must exist a thin wall 20 resting immediately against the vertical bars 2 to prevent bolt 6 from hitting the vertical bars 2 when it is retracted. Since control box 8 cannot possibly be made small enough to fit down between the horizontals bars 21 for all enclosure styles, a spacer 9 must be used as a standoff platform to locate control box 8 far enough away from the vertical bars 2 to always avoid and clear horizontal bars 21. If spacer 9 is too thick though, the resulting offset between the axes of solenoid rod 12 and bolt 6 will cause a sideways force moment during retraction leading to binding and poor operation. Spacer 9 must therefore be only slightly thicker then the horizontal bars 21 and just narrow enough to fit between the closest spaced horizontal bars 21. The spacer 9 is positioned between the control box 8 and the door 3. The mounting plate 10 is positioned on the opposite side of the door 3. The control box 8, the spacer 9 and the mounting plate 10 are connected together with screws 17 or other conventional means. Depending on the thickness and spacing of the vertical bars 2, the spacer 9 may be provided in multiple thicknesses and/or widths, or multiple spacers 9 may be used as needed. The spacer 9 is provided with a recess 18 into which the end of the bolt 6 protrudes when the solenoid 11 operates to disengage the bolt 6 from the keeper 5. The recess 18 may have a cross-section that is rectangular, square, circular, oval, or any other suitable shape. The recess 18 may be centered in the spacer 9, or offset to one side. The recess 18 has a wall 19 to prevent the bolt 6 from impinging on the control box 8 and a thin wall 20 to prevent the bolt 6 from impinging on the vertical bars 2 of the door 3. It is critically important to the success of the entire operation that the thin wall 20 of spacer 9 be very thin to allow bolt 6 to travel back and forth into and out of the recess 18 without ever binding against wall 19 or thin wall 20, or hitting any of the vertical bars 2 that the bolt 6 travels over and adjacent to. The control box 8, the spacer 9 and the mounting plate 10 may be provided with multiple mounting holes in order to accommodate the different bar 2 spacings on various models of cages 1. The mounting plate 10 extends beyond the limits of the control box 8 to cover the space on the door 3 behind the bolt 6. This will prevent a pet in the cage 1 from pawing at the bolt 6 and possibly opening it. This problem is a common complaint by owners of this type of enclosure, which is the most common in use. A blocking plate 22 similar to mounting plate 10 may be mounted on the cage 1 behind the area where the bolt 6 extends into the keeper 5 as an additional precaution.

For cages 1 that have multiple bolts 6 and keepers 5, a single remote control unit 14 may be used to operate multiple control boxes 8 and solenoids 11. For multiple cage 1 applications, the remote control unit 14 may be provided with multiple codes for the various cages 1. The control box 8, the spacer 9 and the mounting plate 10 may be used on both left and right oriented doors. Alternatively, all of the components mounted on the cage 1 may be mounted on the door 3, and those parts mounted on the door 3 may be mounted on the cage 1.

The remote control unit 14 is used to activate the solenoid 11. When activated, the solenoid 11 pulls the solenoid rod into itself, withdrawing the bolt 6 from the keeper 5. An electrical relay is incorporated within the control circuitry 13 with a timer that removes power to the solenoid 11 after approximately ½ second to prevent damage to the solenoid 11 if left on. When electricity is removed, the solenoid 11 is de-energized and no longer applies force in either direction to the solenoid rod 12. In the free state the bolt 6 can be moved in either direction, i.e. latching or unlatching the cage door 3 manually as much as desired. During this situation the cage 1 can be used as before the alteration. This feature provides the much desired ability to manually release the pet at any time, including and especially during an emergency without having to have the remote control unit 14 at hand. Some prior art designs require a remote control unit to be used to open the door, or the application of excessive manual force to overcome the springs, the solenoid locking force, etc., to open the door, a dangerous characteristic during an emergency. Since, these items are conventional no further explanation is needed or will be given.

The control circuitry 13 includes a Radio Frequency (RF) control module. RF remote controls are used for a variety of items and work by receiving signals via radio signals. The typical frequency is around 400 MHz, but other frequencies can be used. A special digital coding system is used to separate one system from another. A code is set on the remote control unit 14 and the same code is set in the control circuitry 13. When the remote control unit 14 sends out a radio signal, if the receiver module is set at the correct frequency, the control circuitry 13 performs its programmed operation.

Although the Pet Cage Remote Door Opener and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

I claim:
1. An apparatus for unlocking an enclosure from a remote location comprising:
 a keeper,
 means for mounting said keeper on said enclosure,
 a bolt,
 means for mounting said bolt on a door of said enclosure,
 means on said keeper for receiving said bolt, thereby latching said door of said enclosure with said enclosure,
 said bolt secured to a solenoid rod,
 said solenoid rod extending from a solenoid,
 said solenoid being connected to control circuitry,
 said control circuitry being connected to a power source,
 said control module including a receiver,
 said control module is activated by a remote control unit,
 said solenoid rod being moveable from a first position to a second position,
 said bolt engages said keeper in said first position and said door is latched to said enclosure,
 said bolt disengages said keeper when said solenoid is activated to move said solenoid rod from said first position to said second position and said door is unlatched from said enclosure,
 said remote control unit activates said receiver in said control module to activate solenoid and said solenoid rod moves from said first position to said second position,
 said apparatus being mounted on one of said enclosure and said door with a spacer positioned between said appara- tus and one of said enclosure and said door and with a mounting plate on the opposite side of one of said enclosure and said door, said apparatus, said spacer and said mounted plate being fastened together with connecting means, said mounting plate extending beneath said means for mounting said bolt on one of said enclosure and said door such that an animal within said enclosure cannot access said bolt.

2. The apparatus of claim 1 further comprising a recess in said spacer for receiving the end of said bolt when said solenoid is activated.

3. The apparatus of claim 2 further comprising said recess in said spacer having a wall to prevent said bolt from impinging on the structure of one of said enclosure and said door.

4. The apparatus of claim 3 further comprising said wall is positioned between said recess in said spacer and said structure of one of said enclosure and said door, and said wall being of sufficient thinness enough to allow said bolt to have back and forth motion freely without binding or rubbing against said wall during said motion.

5. The apparatus of claim 1 further comprising said enclosure comprises a grid of horizontal bars and vertical bars, said spacer having a thickness, a width and a length, at least one of said thickness, said width and said length being dimensioned to allow said spacer to be mounted between one said horizontal bars and vertical bars, wherein said apparatus may be mounted on a wide range of grid configurations.

6. The apparatus of claim 1 further comprising a blocking plate mounted on the other one of said enclosure and said door beneath said keeper such that an animal within said enclosure cannot access said bolt when said bolt engages said keeper.

7. The apparatus of claim 1 further comprising said bolt being secured to said solenoid by a flexible connection such as a plastic tie wrap, wherein said flexible connection permits the bolt to move an additional distance after said soleniod stops moving in said second position.

8. The apparatus of claim 7 further comprising said flexible connection secures said solenoid to the top side of said bolt.

9. The apparatus of claim 7 further comprising said flexible connection secures said solenoid to the bottom side of said bolt.

10. An apparatus for unlocking an enclosure from a remote location comprising:
a keeper,
means for mounting said keeper on said enclosure,
a bolt,
means for mounting said bolt on a door of said enclosure,
means on said keeper for receiving said bolt, thereby latching said door of said enclosure with said enclosure,
said apparatus being connected to said bolt,
said apparatus being operative to move said bolt from a latched position engaging said keeper to an unlatched position wherein said bolt is disengaged from said keeper,
said apparatus being mounted on one of said enclosure and said door with a spacer positioned between said apparatus and one of said enclosure and said door and with a mounting plate on the opposite side of one of said enclosure and said door,
said apparatus, said spacer and said mounted plate being fastened together with connecting means,
said mounting plate extending beneath said means for mounting said bolt on one of said enclosure and said door such that an animal within said enclosure cannot access said bolt.

11. The apparatus of claim 10 further comprising a recess in said spacer for receiving the end of said bolt when said apparatus is activated.

12. The apparatus of claim 11 further comprising said recess in said spacer having a wall to prevent said bolt from impinging on the structure of one of said enclosure and said door.

13. The apparatus of claim 12 further comprising said wall is positioned between said recess in said spacer and said structure of one of said enclosure and said door, and said wall being of sufficient thinness enough to allow said bolt to have back and forth motion freely without binding or rubbing against said wall during said motion.

14. The apparatus of claim 10 further comprising said enclosure comprises a grid of horizontal bars and vertical bars, said spacer having a thickness, a width and a length, at least one of said thickness, said width and said length being dimensioned to allow said spacer to be mounted between one said horizontal bars and vertical bars, wherein said apparatus may be mounted on a wide range of grid configurations.

15. The apparatus of claim 10 further comprising a blocking plate mounted on the other one of said enclosure and said door beneath said keeper such that an animal within said enclosure cannot access said bolt when said bolt engages said keeper.

16. The apparatus of claim 10 further comprising said bolt being connected to said apparatus by a flexible connection such as a plastic tie wrap, wherein said flexible connection permits the bolt to move an additional distance after said apparatus stops operating.

17. The apparatus of claim 16 further comprising said flexible connection secures said apparatus to the top side of said bolt.

18. The apparatus of claim 16 further comprising said flexible connection secures said apparatus to the bottom side of said bolt.

* * * * *